Feb. 9, 1960 R. E. BAUER 2,924,241
ELECTRO HYDRAULIC SERVO VALVE
Filed Nov. 30, 1956 4 Sheets-Sheet 1

INVENTOR.
Russell E. Bauer.
BY
Harness, Dickey & Pierce.
ATTORNEYS.

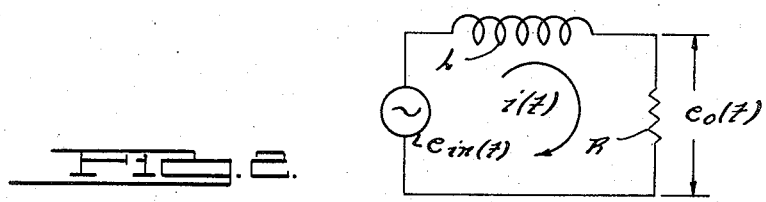
FIG. 2.
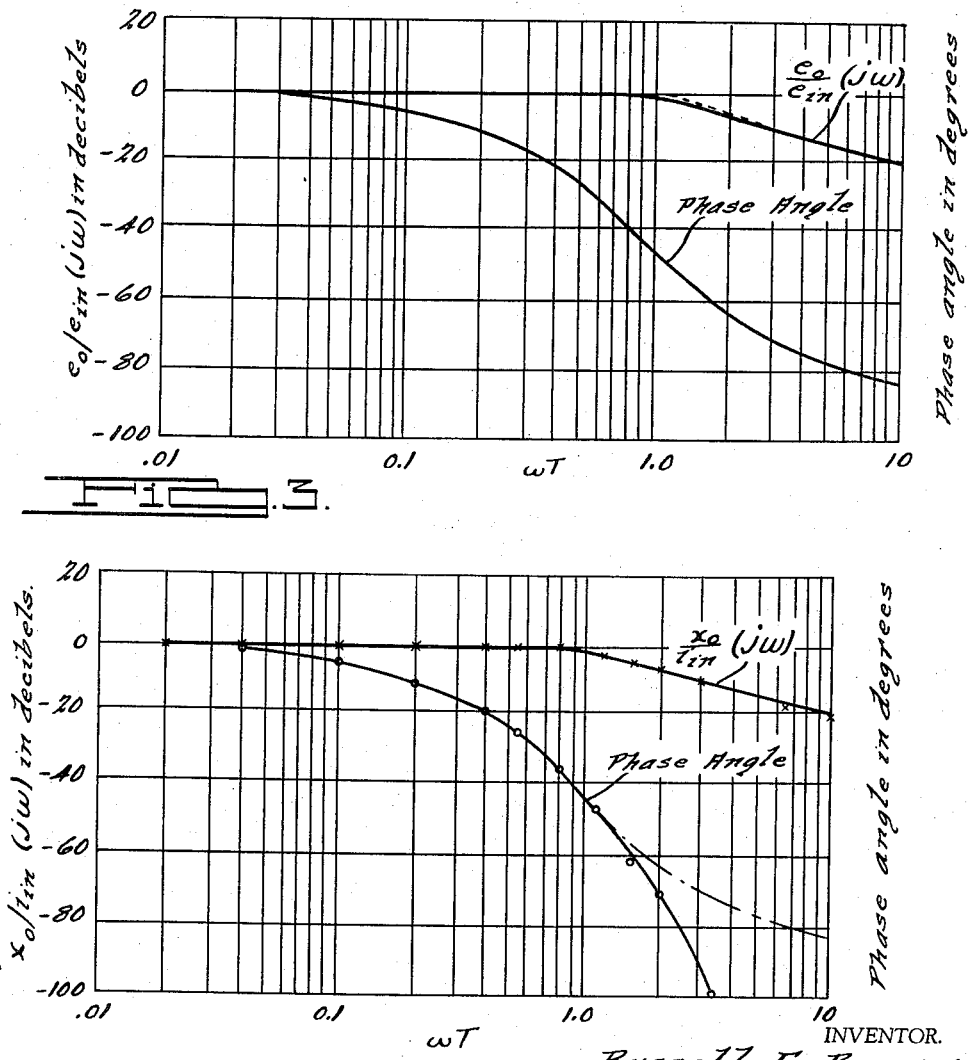
FIG. 3.
FIG. 4.
INVENTOR.
Russell E. Bauer
BY
Harness, Dickey & Pierce
ATTORNEYS.

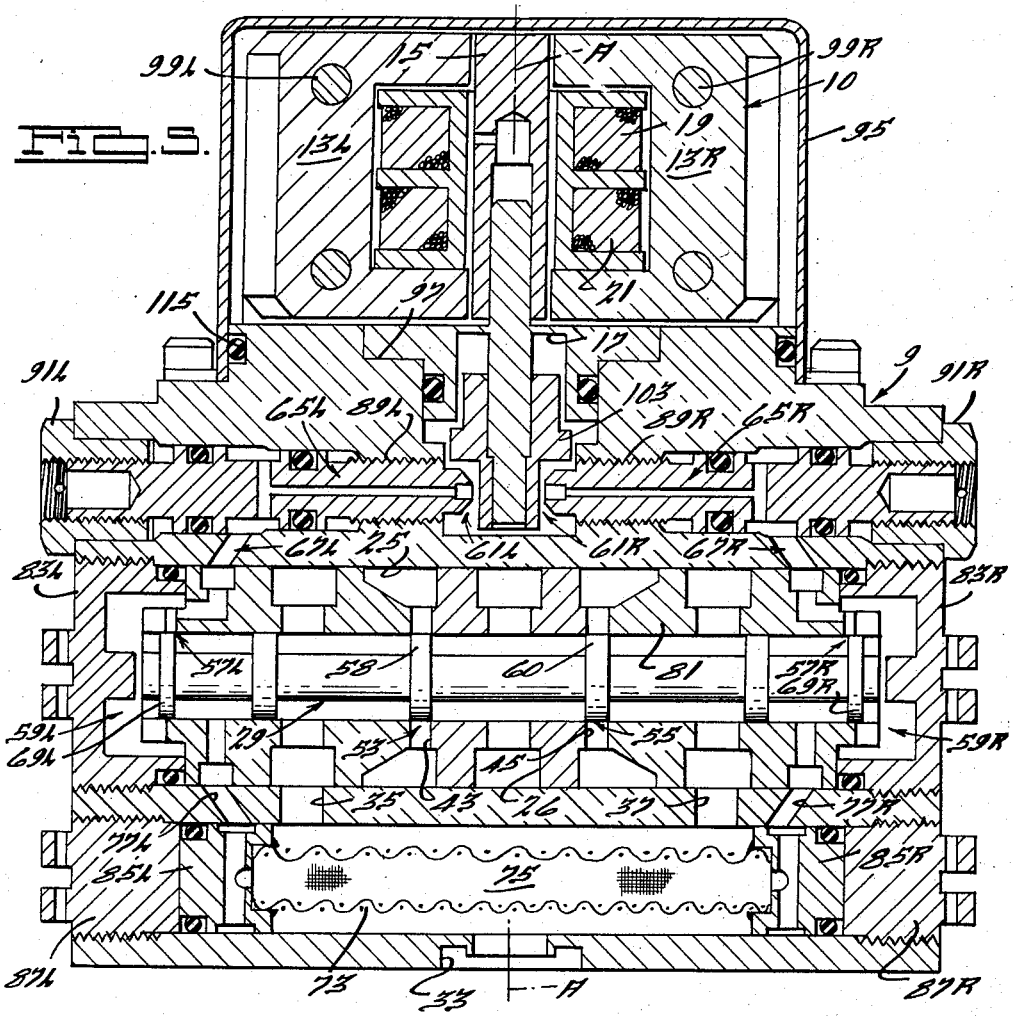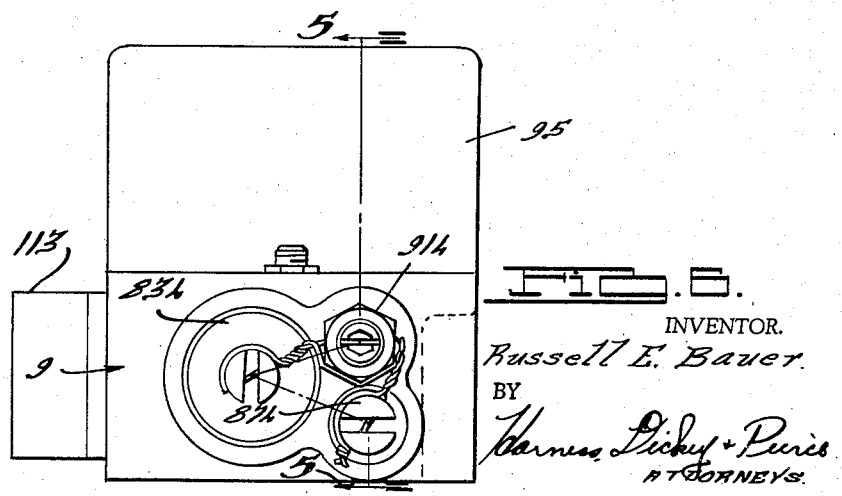

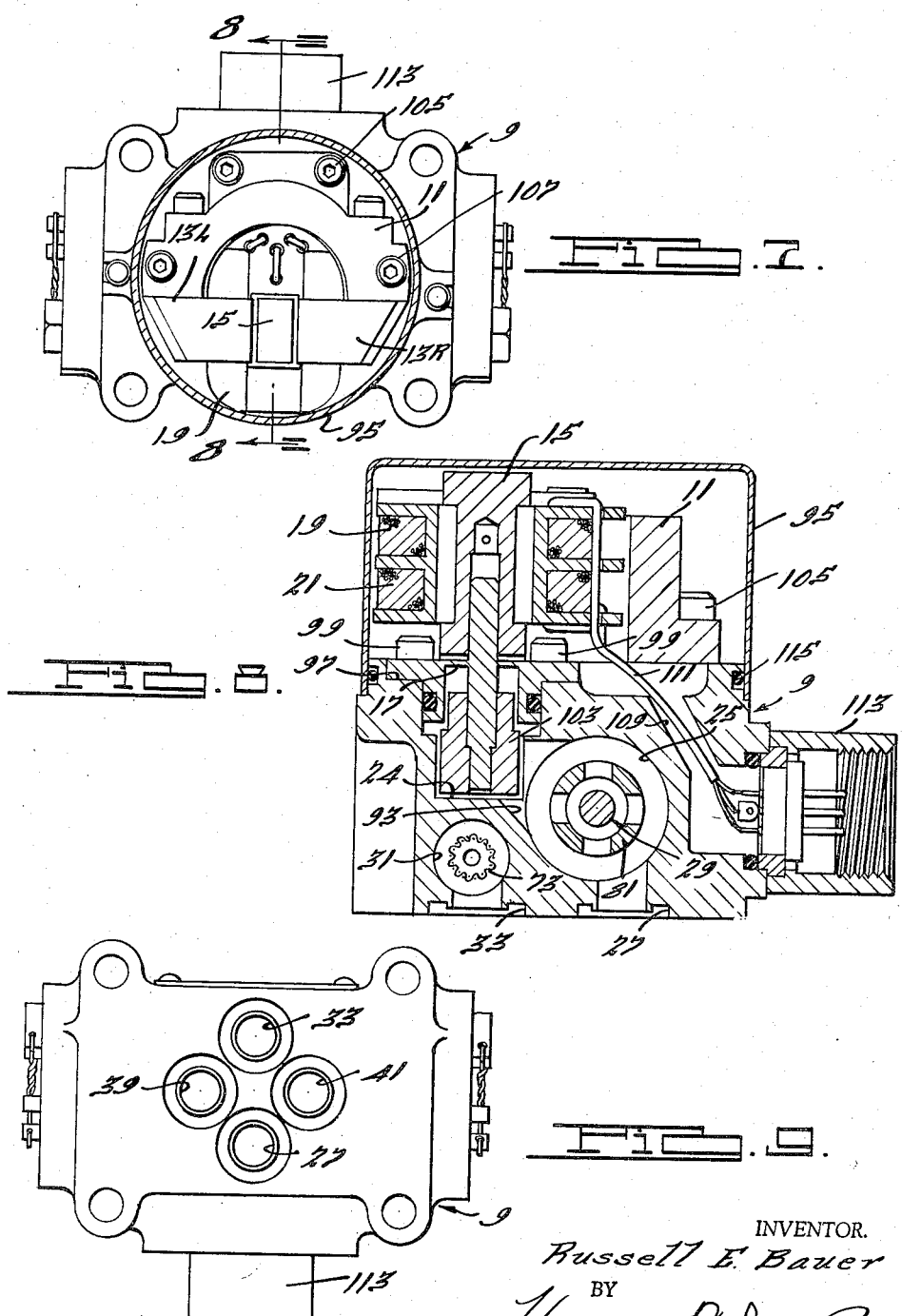

United States Patent Office 2,924,241
Patented Feb. 9, 1960

2,924,241

ELECTRO HYDRAULIC SERVO VALVE

Russell E. Bauer, Detroit, Mich., assignor, by mesne assignments, to Ex-Cell-O Corporation, a corporation of Michigan Application November 30, 1956, Serial No. 625,361

7 Claims. (Cl. 137—623)

This invention relates to improvements in flow control servo valves for electro-hydraulic servo systems.

Important objects of the present invention are to provide an improved servo valve which has a novel hydraulic control circuit comprising a pair of pressure chambers and for each pressure chamber a variable inlet restriction and a variable outlet restriction; to provide an improved servo valve inclusive of the said control circuit which has dynamic characteristics which are well defined and which result in maximum performance in a compatible electro-hydraulic system; to provide an improved servo valve which has a control circuit characterized in that the said inlet restrictions are controlled by the output member and the said outlet restrictions are controlled by the input member; to provide an improved servo valve which has a control circuit further characterized in that it positions the output member linearly as a function of the displacement of the input member and in that it includes an hydraulic feedback amplifier whereby the output member is positioned in stable equilibrium when a percentage change in area of the outlet restrictions is balanced by an equal percentage change in the area of the inlet restrictions.

Still other important objects of the present invention are to provide an improved servo valve inclusive of the said control circuit which has a balanced symmetrical construction whereby it is self-compensating for changes in ambient and operating conditions; to provide an improved servo valve of the type specified which includes a novel filter system for the control circuit which is so arranged as to have the same effect on the pressure fluid flowing in each half of the control circuit; and to provide an improved servo valve of the character indicated which has an improved structural arrangement for bodily positioning the variable outlet restrictions relative to the input member whereby to adjust the centered position of the output member.

The above and related objects will appear more fully during the course of the following description taken in conjunction with the accompanying drawings.

In the drawings:

Fig. 2 is a diagram of the electrical network the characteristics of which are analogous to the dynamic characteristics of the servo valve embodying the invention;

Figs. 3 and 4 are plots respectively of the characteristics of the electrical circuit of Figure 2 and of the dynamic characteristics of the servo valve embodying the invention;

Fig. 5 is an enlarged vertical sectional view of the commercial embodiment of the servo valve schematically illustrated in Figure 1 being taken substantially along the line 5—5 of Figure 6;

Fig. 6 is a side elevational view of the said commercial embodiment;

Fig. 7 is a horizontal sectional view of the structure of Figure 5 taken substantially along the line 7—7 thereof;

Fig. 8 is a vertical sectional view of the structure of Figure 7 taken substantially along the line 8—8 thereof; and Fig. 9 is a bottom view of the structure of Figure. 8.

Figure 1:
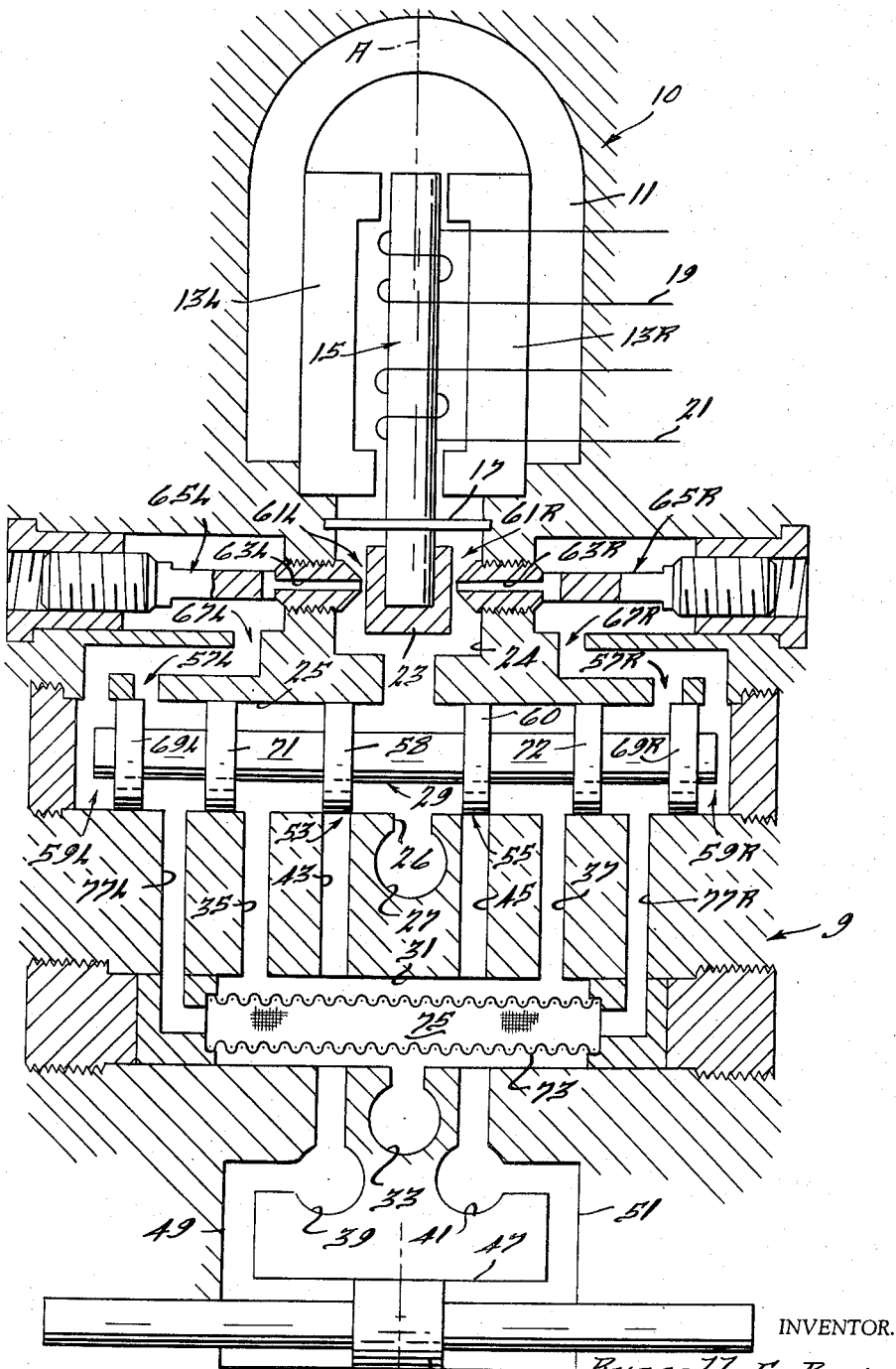
Fig. 1 is a simplified vertical sectional view schematically illustrating the servo valve embodying the invention and including an hydraulic actuator controlled thereby.

Briefly, the principal structure of the servo valve constituting the subject matter of the present invention comprises in combination an electro-mechanical circuit for receiving electrical input signals from a sensing device, an hydraulic actuator circuit which includes an output member for controlling the flow of pressure fluid from a suitable source to a reversible load device or actuator and an hydraulic control circuit for controlling the movement of the output member as a function of the amplitude and polarity of the received signals. The servo valve may be employed in widely different electro-hydraulic systems as for example one in which the sensing device is a gyroscope on an aircraft and the actuator may control the movement of mechanical devices on the aircraft which must be accurately actuated in response to electrical signals from the gyroscope.

To facilitate a clear understanding of the invention in its entirety the servo valve will first be described with reference to the schematic illustration of Fig. 1 and related Figs. 2–4, omitting many details of construction which will be supplied in connection with the description of the commercial form of the valve shown in Figs. 5 through 9.

Referring now to Fig. 1, the housing of the servo valve is indicated generally at 9 and disposed within the housing is an electrical stroke motor, generally designated 10, which constitutes the electro-mechanical circuit of the servo valve and comprises a polarizing magnet 11, a pair of pole pieces 13L and 13R and an armature 15 pivotally mounted between the pole pieces 13L and 13R. The structure for mounting the armature 15 will be described in greater detail hereinafter and at this point it will suffice to state that the armature 15 is mounted by way of a flexible diaphragm 17 the peripheral portions of which are fixed with respect to the housing 9. The diaphragm 17 isolates the stroke motor from the hydraulic system and functions as a spring return on the armature developing bending stresses as the armature is pivoted. Encircling the armature 15 are a pair of coils 19 and 21 which receive electrical signals from a sensing device (not shown) and alter the magnetic flux in the gap between the pole faces 13L and 13R to actuate the armature 15 therebetween as a function of the polarity and amplitude of the input signals. For example, when the armature 15 is centered the flux in the gap between it and the pole faces 13L and 13R is balanced but when a direct current signal is passed through one of the coils 19 and 21, the flux in the gap between one pole face and the armature is increased while the flux in the gap between the other pole face and the armature is decreased. This unbalanced flux creates a force which pivots the armature 15 until such force is balanced by the bending strain on the diaphragm 17. When the control signal drops to zero the strain on the diaphragm 17 returns the armature 15 to its centered position.

The hydraulic system of the servo valve as previously mentioned is isolated from the stroke motor 10 by the diaphragm 17 and the lower end 23 of the diaphragm 17 which will be termed herein the input member operates within a chamber 24 which communicates through a bore 25 and passageway 26 with a port 27 leading to the sump or drain for the hydraulic pressure fluid. An output member 29 in the form of a cylindrical valve spool is slidably disposed within the bore 25. The bore 25 communicates through another bore 31 with a main inlet or pressure port 33 which is adapted to be connected to a suitable source (not shown) of pressure fluid which feeds the servo valve. Flow of pressure fluid through the servo valve for controlling the movement of a load device or actuator, as at 34, is controlled by the position of the spool valve output member 29 and takes place in the hydraulic actuator circuit of the servo valve which includes inlet passageways 35 and 37 which connect the bore 31 with the bore 25. Flow through the inlet passageways 35, 37 is always in one direction from the pressure port 33 to the bore 25. The actuator circuit also includes load passageways 43 and 45 which connect the bore 25 with load or outlet ports 39 and 41 and which are isolated from the bore 31. Flow through the passageways 43 and 45 occurs oppositely and the direction depends upon the direction of movement of the output member 29.

The output ports 39 and 41 are adapted to be connected to opposite ends of the actuator cylinder 47 through conduits 49, 51 respectively. The actuator 34 in the example shown is in the form of a piston which is slidably disposed in the cylinder 47 and movable in each of opposite directions as determined by the direction of fluid flowing in the load passageways 43 and 45. Controlled ports 53 and 55 are formed by the bore 25 and the passageways 43 and 45 and are controlled respectively by lands 58 and 60 formed on the valve spool output member 29. The controlled ports 53 and 55 meter the flow of pressure fluid to and from the actuator 34 between the pressure port 33 and the drain port 27. When the output member 29 is in its centered position the ports 53 and 55 are closed by the lands 58 and 60. Upon movement of the output member 29 in one direction from its centered position, as for example to the right of center, the passageway 35 is connected with the passageway 43 through the controlled port 53 and flow of pressure fluid occurs to the left side of the actuator 34 from the pressure port 33 by way of the passageway 35, the passageway 43, the outlet port 39, and the conduit 49. Simultaneously the passageway 45 is connected with the drain port 27 through the controlled port 55 and the fluid displaced from the right side of the actuator 34 due to the movement of the actuator to the right is directed to the passageway 45 and thence to the drain port 27 through the conduit 51 and the outlet port 41, the amount of fluid flow to the actuator being proportional to the displacement of the output member. Upon movement of the output member to the left of its centered position the actuator 34 is moved to the left in a manner similar to that described.

The movement of the spool valve output member 29 is controlled by the hydraulic control circuit of the servo valve which is divided into a pair of symmetrically arranged hydraulic paths which include from the perssure port 33 to the drain port 27, a pair of variable inlet restrictions 57L and 57R, a pair of pressure chambers 59L and 59R and a pair of variable outlet restrictions 61L and 61R. The outlet restrictions 61L and 61R are formed between the input member 23 and orifices 63L and 63R provided by nozzles 65L and 65R respectively. The chambers 59L and 59R communicate with the orifices 63L and 63R by the system of passageways shown and indicated generally at 67L and 67R. The inlet restrictions 57L and 57R are formed between ports as shown and lands 69L and 69R formed on the valve spool 29. Inwardly of the lands 69L and 69R, a pair of lands 71 and 72 are also formed on the spool valve 29 which isolates the hydraulic control circuit from the hydraulic actuator circuit. The fluid flowing in the control circuit from the pressure port 33 is filtered by an arrangement of filter means which will be referred to in greater detail hereinafter and which includes a filter element 73. The bore 75 of the filter element 73 connects with the inlet restrictions 57L and 57R through the bore 25 and inlet control passageways 77L and 77R. Flow of fluid through the passageways 77L and 77R is always in one direction from the pressure port 33 to the drain port 27. Of course the control circuit can function if the pressure fluid is passed therethrough in the reverse direction, i.e. from the port 27 through the passageways 77L and 77R to the port 33 provided the sense of the feedback is reversed and preferably with the filter element 73 arranged to filter the pressure fluid flowing in this instance into chamber 24. The sense of the feedback may conveniently be reversed by changing the location of the inlet restrictions 57L and 57R so that they are controlled respectively by the right hand face of the land 72 and the left hand face of the land 71. The lands 69L and 69R in this instance will not control any restrictions.

The pressure chambers 59L and 59R are arranged at opposite ends of the output member 29 and it will be apparent that if the areas of the inlet restrictions 57L and 57R are equal and the areas of the outlet restrictions 61L and 61R are equal the pressure in each of the chambers 59L and 59R will also be equal. This occurs for a no-signal condition of the stroke motor wherein the flow through the outlet restrictions 61L and 61R is equal and the pressure in the chambers 59L and 59R is balanced so that the output member 29 is yieldably retained in its centered position. To compensate for unequal flow through the outlet restrictions 61L and 61R for a no-signal condition of the stroke motor that might be caused by variation in the construction of the halves of the control circuit, the nozzles 65L and 65R are bodily movable relative to the input member 23 to adjust the centered position of the output member 29 as will be described in greater detail hereinafter.

The diameter of the orifices 63L and 63R is fixed and the input member 23 moves between the orifices 63L and 63R as a function of the sense and amplitude of the input signals received by the coils 19 and 21. Movement of the input member 23 toward or away from one orifice increases or decreases the space betweenn the input member and that orifice to give a greater or lesser peripheral area for the outlet restriction. The orifices 63L and 63R are so constructed with relation to the input member 23 that the change in area of the outlet restrictions 61L and 61R occurs as a linear function of the movement of the input member 23. As the input member is moved toward one orifice the flow therethrough is decreased while the flow through the other orifice is increased which is reflected as a pressure differential in the pressure chambers 59L and 59R whereby the output member 29 is displaced from its centered position in the direction of the lower pressure. Hydraulic feedback occurs as a result of the movement of the output member 29 which tends to equalize the pressure in the fluid chambers 59L and 59R since the motion of the lands 69L and 69R changes the area of the inlet restrictions 57L and 57R. As exemplary when the output member 29 moves to the right in response to a greater pressure on its left end than on its right end due to a movement of the input member 23 to the left of center, the land 69L causes a decrease in the area of the restriction 57L and the land 69R causes an increase in the area of the restriction 57R. Consequently when the percentage change in area of the inlet restrictions 57L and 57R equals the initial percentage change in area of the outlet restrictions 61L and 61R the fluid pressure in chambers 59L and 59R tends to return to its initial value. The output member 29 will thus be retained displaced in stable equilibrium in the new position which is a linear function of the movement of the input member 23. Upon a return of the input member 23 to its centered position as a result of a no-signal condition of the stroke motor 10 the pressure equilibrium existing in chambers 59L and 59R is again upset due to the increase in area of the outlet restriction 61L and a decrease in the area of the outlet restriction 61R. The pressure in chamber 59L tends to decrease and the pressure in chamber 59R tends to increase resulting in movement of the output member 29 to the left. The movement of the output member 29 in this direction results in an increase in the area of the inlet restriction 57L tending to increase the pressure in the chamber 59L and results in a decrease in the area of the inlet restriction 57R tending to decrease the pressure in the chamber 59R. The output member 29 continues to move until the pressure in the chambers becomes balanced and at this point the output member 29 is again in its centered position.

As shown in Fig. 1 the servo valve is constructed so that all of the parts thereof are symmetrically arranged about the vertical plane of the axis indicated at A—A therein. This symmetrical push-pull construction which is also used throughout the commercial embodiment to be described makes the servo valve self-compensating for changes in ambient and operation conditions such as temperature, drain pressure, vibration, and external acceleration forces whereby the output member will not shift its position as a result of such changes but only as a result of a signal applied to the stroke motor.

The dynamic characteristics of the servo valve of the present invention within the range of its operating frequencies in conjunction with the particular structural arrangement of the hydraulic control circuit serve to distinguish it from servo valves heretofore. The dynamic characteristics of the servo valve can be most readily understood by analogy to an electrical network whose characteristics are well understood and which is shown in the diagram of Fig. 2 which will be referred to later. All electro-mechanical analogies are based on the similarity between the elements of the electrical and mechanical systems. For example electrical inductance is analogous to mass or mechanical inductance; electrical capacitance to compliance (deflection per unit force) or mechanical capacitance; and electrical resistance to mechanical resistance. The particular electro-mechanical analogy to be herein described is a rigorous analogy which, as will appear, has been demonstrated in actual practice within the limits of available test equipment.

Referring now to Fig. 2 which is a diagram of a series LR circuit equivalent to the control circuit of the subject servo valve, resistance R therein which is constant represents the total restriction to the flow of fluid in the control circuit of the servo valve. Inductance L which is also constant represents the mass of the moving parts in the control circuit of the servo valve. Current $i(t)$ indicated by the arrow for one direction of flow which is also constant for any static condition represents the total quantity of fluid flowing in the control circuit. Voltage $e_{in}(t)$ represents the displacement of the input member 23 and voltage $e_o(t)$ the displacement of the valve spool output member 29.

Since the inlet restrictions are controlled by the output member 29 in such a manner that the movement of the latter causes as much increase in the area of one inlet restriction as it causes decrease in the other inlet restriction and since the movement of the input member 23 causes as much increase in the area of one outlet restriction as it causes decrease in area of the other outlet restriction, it can be seen that for any condition of equilibrium the total restriction in the control circuit and the total quantity of pressure fluid flowing therethrough is a constant and therefore the equivalent mechanical elements of the electrical network of Fig. 2 are present in the control circuit of the subject valve. The small volumes of pressure fluid in chambers 59L and 59R and the passageways leading to and from them in the control circuit and the low mass of the valve spool output member 29 have a natural frequency which is far above the operating spectrum or range of operating frequencies of the servo valve. Also the low time constant of the stroke motor 10 from input current to output displacement and the high natural frequency of the armature 15 and the diaphragm 17 are likewise far above the operating spectrum of the servo valve. The dynamic characteristics shown in Fig. 4 which are of the subject servo valve are those of a first order system and result from the fact that the servo valve has dynamic mechanical inductance and resistance but does not have any dynamic mechanical capacitance within its operating spectrum.

Electric circuit theory teaches that for Fig. 2 a sinusoidal variation of applied voltage $e_{in}(t) = E_{in}S_{in}st$ and that the equation in non-dimensional form which represents the direction and magnitude of $e_o$ to $e_{in}$ is:

(1)
$$\frac{e_o}{e_{in}}(jw) = \frac{K_1}{1+jwT}$$

where $$T = \frac{L}{R}$$

$K_1$ = static gain

Similarly for the mechanical system which is the control circuit of the servo valve:

(2)
$$\frac{x_o}{i_{in}}(jw) = \frac{K_2}{1+jwT}$$

where $X_o$ = displacement of the output member
$i_{in}$ = current input to the stroke motor which is the same as displacement of the input member $$T = \frac{\text{Mass}}{\text{Hydraulic resistance}}$$

$K_2$ = static gain

Figs. 3 and 4 show the attenuation versus frequency characteristics, the phase versus frequency characteristics, and their inter-relation for the electrical circuit shown in Fig. 2 and for the control circuit of the servo valve respectively. The dynamic characteristics of the servo valve shown in Fig. 4 are plotted from actual data and at the high limit of its operating spectrum the phase shift characteristics fall off somewhat from the theoretical as indicated by the dotted line and this is due in part to the limitations of the test equipment available at the time the tests were run.

Referring now to Figs. 5–9, the same reference numerals are employed as in Fig. 1 to indicate like parts and as the description of the details of the commercial embodiment proceeds further features of the servo valve will appear.

As can be seen from Figures 6 and 8 in the commercial form of the valve bore 25 which houses the output member 29 is substantially offset laterally from the bore 31 which houses the filter element 73 and the aligned bores in which the nozzles 65L and 65R are carried so that both of the vertical sectional views of Fig. 1 and Fig. 5 are in reality developed sections as indicated by the line 5—5 of Fig. 6. It would appear from Fig. 1 that the lands on the valve spool output member 29 engage the surfaces of the bore 25, but actually in the commercial form of the valve a valve sleeve as shown in Fig. 5 and indicated at 81 is fitted in the bore 25 and the output member 29 is slidably disposed in the valve sleeve 81. The valve sleeve 81 and the valve spool output member 29 are very carefully finished as by a hand lapping operation to hold the small clearance therebetween within the required tolerances which are very strictly maintained. The plurality of passageways as shown are formed in the valve sleeve 81 to define the inlet restrictions 57L and 57R with the lands 69L and 69R and the controlled ports 53 and 55 with the lands 58 and 60 and to connect the chambers 59L and 59R with the passageways 77L, 77R and 67L, 67R. The openings formed in the sleeve 81 to define the inlet restrictions 57L and 57R are not full annular recessed but are formed in only a segment of the circumferential extent of the internal bore of the sleeve 81. The end walls of the chambers 59L and 59R are formed by end plugs 83L and 83R which are threadably engaged in opposite ends of the bore 25 and sealed with O-rings as shown.

As previously mentioned the pressure fluid which passes through the control circuit of the servo valve is filtered by the filter element 73 to prevent clogging of the orifices 63L and 63R. The ends of the element 73 are brazed to fittings 85L and 85R in which are formed suitable passageways to connect the bore 75 of the filter element 73 with the inlet control passageways 77L and 77R. The outer ends of the fittings 85L and 85R are provided with reduced shank portions about which are disposed O-rings for preventing leakage of filtered fluid outwardly thereof. The assembly consisting of the filter element 73 and the fittings 85L and 85R is retained within the bore 31 as shown by screw threaded filter locks 87L and 87R. The pressure fluid entering the inlet control passageways 77L and 77R to flow in each half of the control circuit of the servo valve must pass through the filter element 73 and equal and uniform filtration for this fluid is thus assured. Moreover the pressure fluid that enters the inlet passageways 35 and 37 to flow in the actuator circuit must pass around the filter element 73 and in doing so serves to continuously wash the filter element free of foreign particles and pass them through the relatively large openings of the controlled ports 53 and 55 and out of the valve through the drain port 27. The arrangement of filter means described not only accomplishes washing of the filter element but does so in a manner to affect the pressure fluid flowing in each half of the control circuit equally and is able to provide effective filtration by means of a relatively small filter element for the life of the servo valve.

It was mentioned above that the nozzles 65L and 65R are movable relative to the input member 23 to adjust the centered position of the output member 29 and in the commercial form of the valve this is accomplished by providing threaded connections between the inner ends of the nozzles 65L and 65R and the apertures in the housing which receive these ends as at 89L and 89R. The outer ends of the nozzle 65L and 65R are also threaded and receive nozzle locks 91L and 91R which shoulder against the sides of the housing 9 and urge the nozzles outwardly to lock them in any desired position. The position of the nozzles 65L and 65R is adjusted relative to the input member 23 during initial assembly of the valve to correctly center the output member 29 and the nozzles are then locked in position by the nozzle locks 91L and 91R. The nozzles 65L and 65R are formed as shown to receive pairs of O-rings which span the passageways 67L and 67R and prevent the fluid which enters the nozzles from leaking to their threaded connections. The passageway which interconnects the chamber 24 into which the nozzles discharge and the drain port 27 is shown in Fig. 8 and indicated at 93.

In the commercial form of the valve the stroke motor 10 is removably mounted on top of the housing 9 and enclosed in a metal cap 95. The particular stroke motor shown has been specially constructed and is pre-eminently suited for use in combination with the structure of the hydraulic system of the subject servo valve. The permanent magnet 11 has the particular structural configuration as shown to accommodate the coils 19 and 21 and to serve as a mounting structure for and to polarize the pole pieces 13L and 13R. The coils 19 and 21 extend through and are commonly carried by the pole pieces 13L and 13R as shown. The pole pieces 13L and 13R are affixed to the magnet 11 by suitable fasteners 99L and 99R which extend through the pole pieces 13L and 13R as shown and between which a small clearance is provided for alignment purposes, the importance of which will later appear. The armature 15 and diaphragm structure 17 are joined as a unit in the instance shown and the assembly is disposed with respect to the housing 9 so that a portion of the diaphragm structure projects into the chamber 24. The peripheral portion of the diaphragm structure 17 is fitted in an annular recess 97 in the housing and affixed thereto as by the cap screws 99 and an O-ring is retained in the skirt of the diaphragm structure as shown to insure against leakage of fluid from the chamber 24. The diaphragm structure 17 and the housing 9 are non-magnetic. The center portion of the diaphragm structure 17 is relatively thin and cylindrical and the armature 15 is fitted to the upper end thereof as shown. The armature 15 is of rectangular cross-section and formed of relatively greater body of magnetically permeable material to provide a low reluctance path for the lines of flux generated by the coils 19 and 21. Secured to the lower end of the center portion of the diaphragm structure 17 is a counter-weight member 103 against which the fluid issuing from the nozzles 63L and 63R impinges. The polarizing magnet 11, the pole pieces 13L and 13R and the coils 19 and 21 which are first loosely assembled as a unit are disposed about the armature-diaphragm assembly and secured to the housing 9 by pairs of cap screws 105 and 107. Between the screws 105 and 107 and the apertures in the magnet 11 through which they extend a clearance is provided as described for the pole pieces 13L and 13R so that they and the magnet may be properly aligned with respect to the armature 15 before being securely fastened. This is necessary to balance the air gaps between the pole pieces and the armature to insure that the center of the magnetic spring rate coincides with the center of the mechanical spring rate as determined by the armature-diaphragm assembly which is a requisite for balanced static and dynamic operation of the servo valve. Openings are formed in the housing as at 109 completely isolated from the hydraulic portion of the valve to accommodate the lead-in wires 111 for the coils 19 and 21 which are affixed to the terminals of a suitable jack 113. An annular recess 115 is formed in the outer surfaces of the housing 9 as shown in which is fitted an O-ring for engaging the cap 95 and sealing the stroke motor from dust and other foreign matter.

What is claimed is:

1. In a flow control servo valve, means defining a pair of fluid flow paths arranged in parallel and adapted to separately pass pressure fluid therethrough from a common source, means defining an inlet port, a pressure chamber and a single variable outlet flow restriction in each of said paths, a displaceable member movable with respect to the pair of outlet restrictions for differentially varying the areas thereof and the flow therethrough to unbalance the pressure in said chambers, another member movable in said housing in response to and as a function of the differential pressure in said chambers, said other member and said means defining said inlet port cooperating to provide sharp edge variable flow restrictions in each of said fluid flow paths, the movement of said other member differentially varying the areas of and the flow through the pair of inlet restrictions tending to rebalance the pressure in said chambers, said other member being yieldably retained in stable equilibrium as a function of the displacement of the one member when the percentage change in the area of said inlet restrictions substantially equals the initial percentage change in the area of said outlet restrictions.

2. In a flow control servo valve having a housing, means defining a pair of fluid flow paths arranged in parallel and adapted to separately pass pressure fluid therethrough from a common source, means defining an inlet port, an unrestricted portion, and a single variable outlet flow restriction in each of said paths in the order of flow therethrough, a displaceable input member movable with respect to the pair of outlet restrictions for differentially varying the areas thereof and the flow therethrough to unbalance the pressure in said portions, an output member arranged in said housing for metering the flow of pressure fluid between the source and a reversible hydraulic actuator, said output member cooperating with said means defining said inlet port to provide a sharp edge variable flow restriction in each of said fluid flow paths said output member being movable in said housing in response to and as a function of the differential pressure in said portions, the movement of said output member differentially varying the areas of and the flow through the pair of inlet restrictions tending to rebalance the pressure in said chambers, said output member being yieldably retained in stable equilibrium as a function of the displacement of the input member when the percentage change in the area of said inlet restrictions substantially equals the initial percentage change of the area of said outlet restrictions.

3. In a flow control servo valve having a housing, means defining a pair of fluid flow paths arranged in parallel and adapted to separately pass pressure fluid therethrough from a common source, means defining an inlet port, a pressure chamber and a single variable outlet flow restriction in each of said paths, a displaceable input member movable with respect to the pair of outlet restrictions for differentially varying the areas thereof and the flow therethrough to unbalance the pressure in said chambers, an output member arranged in said housing for metering the flow of pressure fluid to a reversible hydraulic actuator, said output member being in the form of a cylindrical spool valve and cooperating with said means defining said inlet port to provide a sharp edge variable flow restriction in each of said fluid flow paths, said output member being axially movable in response to and as a function of the differential pressure in said chambers, the movement of said output member differentially varying the areas of and the flow through the pair of inlet restrictions tending to rebalance the pressure in said chambers, said output member being yieldably retained in stable equilibrium as a function of the displacement of the input member whenever the percenage change in the area of said inlet restrictions substantially equals the initial percentage change in the area of said outlet restrictions.

4. In a flow control servo valve having a housing, means defining a pair of fluid flow paths arranged in parallel and adapted to separately pass pressure fluid therethrough from a common source, means defining an inlet port, a pressure chamber and a single variable outlet flow restriction in each of said paths, a displaceable input member movable with respect to the pair of outlet restrictions for differentially varying the areas thereof and the flow therethrough to unbalance the pressure in said chambers, the movement of said input member effecting linear and equal changes in the areas of said outlet restrictions, an output member arranged in said housing for metering the flow of pressure fluid to a reversible hydraulic actuator, said output member being in the form of a cylindrical spool valve and cooperating with said means defining said inlet port to provide a sharp edge variable flow restriction in each of said fluid flow paths, said output member being axially movable in response to and as a function of the differential pressure in said chambers to differentially vary the areas of and the flow through the pair of inlet restrictions tending to rebalance the pressure in said chambers, the movement of said output member effecting linear and equal changes in the areas of said inlet restrictions, said output member being yieldably retained in stable equilibrium as a function of the displacement of said input member when the percentage change in the area of said inlet restrictions substantially equals the initial percentage change in the area of said outlet restrictions.

5. In a flow control servo valve having a housing, means defining a pair of fluid flow paths arranged in parallel and adapted to separately pass pressure fluid therethrough from a common source, a variable inlet flow restriction, a pressure chamber and a variable outlet flow restriction in each of said paths, a displaceable input member movable with respect to the pair of outlet restrictions for differentially varying the areas thereof and the flow therethrough to unbalance the pressure in said chambers, means defining an actuator circuit for directing pressure fluid through said housing between the source and a reversible hydraulic actuator, an output member arranged in said housing to meter the fluid passing in said actuator circuit, said output member being movable in response to and as a function of the differential pressure in said chambers, the movement of said output member differentially varying the areas of and the flow through the pair of inlet restrictions tending to rebalance the pressure in said chambers, and filter means arranged to commonly filter the fluid flowing to each of said paths and to be washed by the fluid flowing to the actuator circuit, said output member being yieldably retained in stable equilibrium as a function of the displacement of said input member when the percentage change in the area of said inlet restrictions substantially equals the initial percentage change in the area of said outlet restrictions.

6. In a flow control servo valve having a housing, means defining a pair of fluid flow paths arranged in parallel and adapted to separately pass pressure fluid therethrough from a common source, a variable inlet flow restriction, a pressure chamber and a variable outlet flow restriction in each of said paths, a displaceable input member, electrically operated means for receiving electrical input signals, means connecting said input member and said electrically operated means to move said input member as a function of said input signals, said input member being movable with respect to the pair of outlet restrictions for differentially varying the areas thereof and the flow therethrough to unbalance the pressure in said chambers, the movement of said input member effecting linear and equal changes in the areas of said outlet restrictions, means defining an actuator circuit for directing pressure fluid through said housing between the source and a reversible hydraulic actuator, an output member arranged in said housing for metering the flow of pressure fluid passing in said actuator circuit, said output member being movable in response to and as a function of the differential pressure in said chambers to differentially vary the areas of and the flow through the pair of inlet restrictions tending to rebalance the pressure in said chambers, and filter means arranged to commonly filter the fluid flowing to each of said paths and to be washed by the fluid flowing to the actuator circuit, the movement of said output member effecting linear and equal changes in the areas of said inlet restrictions, said output member being yieldably retained in stable equilibrium as a function of the displacement of said input member when the percentage change in the area of said inlet restrictions substantially equals the initial percentage change in the area of said outlet restrictions, the total restriction and the total quantity of pressure fluid flowing in said paths being substantially constant for an equilibrium condition.

7. In a flow control servo valve having a non-magnetic valve body, means defining an actuator circuit for directing pressure fluid through said body between a source and a reversible hydraulic actuator, a valve spool slidably disposed in the valve body for metering the flow of pressure fluid in said actuator circuit, a pressure chamber at each end of said valve spool, a pair of variable inlet restrictions for said chambers comprising spaced ports separately communicating with said chambers and controlled by the movement of the valve spool, a pair of spaced outlet nozzles separately communicating with said chambers, a common discharge chamber for said nozzles, a filter element disposed in a bore in the valve body for commonly filtering the flow of fluid passing to said inlet restrictions and so arranged as to be washed by the flow of fluid traveling to said actuator circuit, electrically operated means including a stroke motor for receiving electrical input signals and a magnetically permeable armature for said motor, a non-magnetic flexible diaphragm member having an input member projecting into said discharge chamber and disposed between said nozzles, said diaphragm member sealing one end of said chamber for isolating the fluid therein from said electrically operated means, another portion of said diaphragm member being connected to said armature whereby the former functions as a spring return for the latter to move said input member as a function of said input signals to differentially vary the areas of and the flow through said nozzles to unbalance the pressure in said chambers, said valve spool having a centered position and being movable in response to and as a function of the pressure differential in said chambers, means for adjustably fixing the position of said nozzles relative to said input member to adjust the centered position of said valve spool, the movement of said valve spool differentially varying the area of and the flow through the pair of inlet restrictions tending to balance the pressure in said chambers, said valve spool being retained in stable equilibrium as a function of the displacement of said input member portion when the percentage change in the area of said inlet restrictions substantially equals the initial percentage change in the area of said nozzles.

References Cited in the file of this patent
UNITED STATES PATENTS

| | | |
|---|---|---|
| 2,396,951 | Horstmann | Mar. 19, 1946 |
| 2,644,121 | Parsons | June 30, 1953 |
| 2,651,744 | Acklin et al. | Sept. 8, 1953 |
| 2,702,529 | Doerfner | Feb. 22, 1955 |
| 2,709,421 | Avery | May 31, 1955 |
| 2,711,717 | Stacey | June 28, 1955 |
| 2,767,689 | Moog | Oct. 23, 1956 |
| 2,797,666 | Chubbuck | July 2, 1957 |
| 2,823,689 | Healy | Feb. 18, 1958 |
| 2,832,318 | Paine | Apr. 29, 1958 |
| 2,835,265 | Brandstadter | May 20, 1958 |
| 2,836,154 | Lantz | May 27, 1958 |